July 28, 1959 R. S. HOPKINS 2,897,282

AUTOMATIC TELEPHONE EXCHANGE SYSTEMS

Filed Jan. 24, 1957 4 Sheets-Sheet 1

AUTOMATIC TELEPHONE EXCHANGE SYSTEMS
Filed Jan. 24, 1957 4 Sheets-Sheet 3
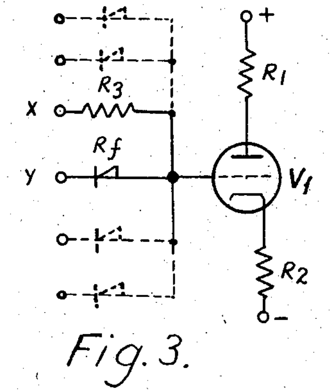
Fig. 3.
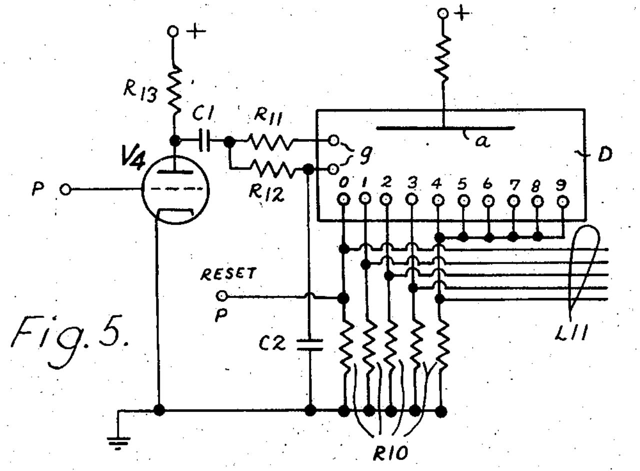
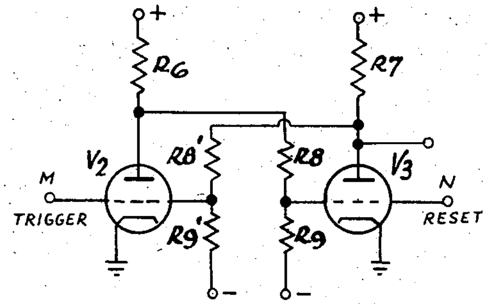
Fig. 4.
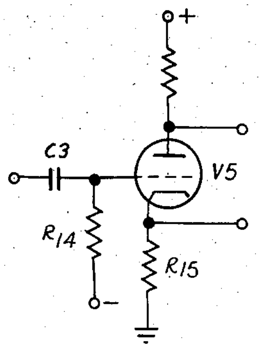
Fig. 6.

AUTOMATIC TELEPHONE EXCHANGE SYSTEMS

Filed Jan. 24, 1957 4 Sheets-Sheet 4

United States Patent Office 2,897,282

Patented July 28, 1959

2,897,282

AUTOMATIC TELEPHONE EXCHANGE SYSTEMS

Ronald Sydney Hopkins, London, England, assignor, by mesne assignments, to Siemens Edison Swan Limited, London, England, a British company Application January 24, 1957, Serial No. 636,197

Claims priority, application Great Britain January 24, 1956

16 Claims. (Cl. 179—18)

This invention relates to automatic telephone exchange systems and the like, in particular to so-called translators as used in such systems for translating a "code" of digits identifying a called exchange into a further code, not necessarily always different from the first, appropriate to the setting up of a route or channel to that exchange and possibly also to the control of other functions such for instance as metering the call. The exchange identification code is received by a "register" by which it is sent to the translator, whence the translation is passed to a "sender" by which the appropriate route is set up and any other functions controlled. The functions of the register and sender are often combined in a so-called register-sender, but this latter term will be used in the following to denote either equipment performing both register and sender functions or simply a combination of register and sender in which each performs its own function. The number required on the called exchange, also identified by a series of digits following those of the exchange identification code, is usually transmitted directly by the register-sender, namely without translation.

As will appear hereinafter, the present invention contemplates using as a translator which may be common to but separate from, a group of register-senders, a continuously operable information storage device of the kind in which information is stored in digital form in a magnetic or other suitable storage medium capable of assuming a readily detectable condition variable in accordance with such information, storage of the information being effected along one or more continuous tracks on the device by selective variation of said condition in unit areas of the recording medium each corresponding to one digit of information. Information to be stored is "written" on to such a device by means of so-called writing heads of which at least one is provided per track. Likewise the stored information can be "read" from the drum by means of so-called reading heads, again at least one per track, which may be separate from the writing heads or, where it is not required to write and read information simultaneously, may in suitable circumstances be constituted by heads capable of fulfilling both functions.

It is at present expected that the setorage device employed will be in the form of a drum, or equivalently of a disc or continuous tape, having at least its operative surface constituted by a magnetic storage medium, storage of digital information being by selective magnetisation of unit areas of the surface. For such a magnetic storage drum or equivalent each reading and/or writing head associated therewith will essentially comprise a small magnetic element defining a magnetic circuit including an air gap and having a small coil linked therewith, the head being in use positioned with the air gap close to the drum surface. For writing, the coil is appropriately energised and the fringing magnetic field induced cross the gap correspondingly magnetises the area of the drum surface instantaneously opposite the gap. When reading, the field produced by the area of the magnetised drum surface instaneously opposite the gap induces a corresponding flux in the magnetic circuit of the head and results in a corresponding output being obtained from the coil.

In our copending application No. 623,669 of 1956 it is proposed to provide for an automatic telephone or like exchange translating equipment comprising a storage device of the kind set forth above at different "addresses" on which translations corresponding to different exchange codes can be stored in digital form, means for receiving from a register-sender a code for which translation is required, and means responsive to such code for selecting the address on the storage device at which the appropriate translation is stored and sending the translation back to the register-sender.

By an address on the storage device is meant that portion of its surface which includes all the unit areas correponding to the digits constituting a particular translation. In the translating equipment according to said copending application, the digits for each translation may be stored in either serial or parallel form; the present invention is concerned with the parallel mode of storage, that is, the digits which make up any one translation are stored in unit areas located each on a different track on the storage device and lying effectively within a narrow strip area extending transversely of the tracks, which narrow strip, having a width commensurate with that of a unit storage area, constitutes the address of the translation concerned. With the translations thus stored in parallel form the digits of each, as read from the storage device, will appear substantially simultaneously at the outputs of the reading heads respectively associated with the different tracks on which the digits are stored.

It is envisaged that the translating equipment described in our said copending application will be most advantageously employed where exchange codes to be translated consist of not more than three decimal digits. There may be circumstances however in which more than three digits may be required to identify a particular exchange. For example, in automatic exchange systems in which both calls between exchanges in different areas and calls between exchanges in the same area are to be capable of being set up by a caller without intervention of an exchange operator, that is, the caller dials all the code and numerical digits appropriate to identifying the called exchange and number irrespective of whether it is a so-called local call or trunk call, the coding scheme employed for identifying the various exchanges according to the areas in which they lie may require an identification code of up to six digits for any particular exchange. Thus the territory over which such a system is in use may be divided up into a number of areas each identified by a code of three digits and including a numbr of exchanges also identified by three-digit codes, each exchange therefore being fully identified by a six-digit code. For dialling a call to an exchange in the same area only the three-digit exchange code need precede the called subscriber's number and a translator would only require to handle these three digits. Likewise in the case of a call to a different area, only the three digits of the area code would need to be translated to route the call to the switching centre of that area. In the case of a call to an adjacent area, however, there may be a direct route over which the calling and called exchanges could be connected without passing through the switching centres of the two areas concerned; if special dialling procedures are to to be avoided the setting up of a call over that route would then require identification of the called exchange in full and a translation for the full identification code of six digits.

As an alternative coding scheme, the territory covered may be divided up into a number of areas each identified by a single digit and including a number of exchanges which, depending on the type of exchange (director non-director, and so on), may be identified by codes of two, three or four digits, each exchange thus being fully identified by a code of three, four or five digits. In this case, as with the other coding scheme discussed, a call to an exchange which is in another area but to which a direct route exists again requires translation of the full identification code of the called exchange, whereas in other circumstances translation may be required for only some of the digits of the code.

It is an object of the present invention to provide translating equipment which on receiving for translation an exchange identification code of a certain number of digits will selectively provide either a translation pertinent to all the digits of the code or, in the absence of such translation, one pertinent to a number of code digits less than the full number. For instance in using the translator in conjunction with the first of the particular coding schemes mentioned above, it would provide a translation for all six digits of a received code identifying an exchange to which a direct junction exists, but would otherwise provide a translation for only the first three digits of the code, namely when no such direct junction is available and the call has accordingly to be routed via the switching centre of the area in which the called exchange lies.

To this end translating equipment according to the present invention includes a storage device of the kind set forth having translation tracks effectively defined thereon for the parallel storage at some addresses of translations pertinent to codes requiring translation for a certain maximum number of digits and at other addresses of translations pertinent to codes requiring trans- for receiving said maximum number of digits of a code requiring translation, selection means responsive to the combined values of the received digits comprising said maximum number for selecting the address at which a translation (if any) pertaining to all the received digits is stored, said selection means functioning in the absence of such translation and in response to the combined values of at least a number of the received digits less than said maximum number for selecting the address at which a translation pertinent to such lesser number of code digits is stored, reading heads associated respectively with the translation tracks, and means for passing towards the output of the translator translation information read by said heads from whichever address the selection means may have selected.

In carrying out the invention the storage device may have effectively defined thereon in addition to the translation tracks, a number of address tracks allocated one to each possible value of each of said maximum number of code digits, that is, for codes requiring translation for, say, a maximum of six decimal digits there would be ten address tracks for each of the six digits, giving a total of sixty. Each address may then be identified by storing at it a number of address digits located one on each of the address tracks which are allocated to the values of the particular code digits for which the address contains a translation, the result being that when any particular address is reached the reading heads associated with those address tracks on which address digits are stored, will read these digits substantially simultaneously. Consequently the selection of an address containing a translation for a given number of digits of a received code (whether it be for the maximum or a lesser number of digits) can be effected by selecting in accordance with the values of the digits concerned the reading heads asociated with the address tracks allocated to these digit values, the production from these reading heads of simultaneous output signals induced by the read digits indicating that an address containing a translation for the code has been reached and being used to control, as by means of gating circuits, the passing towards the translation output of translation information at the address.

Since a code having the maximum number of digits and requiring translation for all of its digits may and usually will include digits corresponding in position and value to a lesser number of digits for which there is also a translation, simultaneous outputs may be produced by the selected reading heads when the addresses containing the translations for the two codes are reached in turn. It may therefore be arranged that an address with a translation for a greater number of code digits comes before one with a translation for a lesser number of code digits included in said greater number and that the simultaneous reading head outputs produced on reaching the first address renders ineffectual the simultaneous outputs produced on reaching the second address.

Before going on to describe particular embodiments of the invention, it may be helpful to indicate in general terms some of the considerations involved in providing various features incorporated in these embodiments.

As with the translator described in our copending application above referred to, it will be most convenient for the translating equipment of the present invention to operate with the translations on the storage device stored in the form of binary digits, namely each having two possible values commonly represented by the numerals "0" and "1." This would require, in the case of a magnetic storage device for instance, only two states of magnetisation in which, respectively, the magnetic material is saturated in the one direction and the other, corresponding to the 0 and 1 values of each digit.

Exchange identification codes in a telephone system are commonly composed of decimal digits, and it would be desirable for the translations to be made available in decimal digit form also, to which end the binary digits of each translation may be effectively grouped so that each group represents a decimal digit. Storage of the decimal digits in this way would then preferably be in accordance with the so-called two-out-of-five code by which each decimal digit is represented by five binary digits and the ten possible values of the decimal digit are represented by different pairs of the binary digits having the value 1 or 0, the remaining three binary digits having the alternate value (that is 0 or 1) in each case. This two-out-of-five code may also be used by a register-sender for sending the decimal digit exchange code to the translator.

It is contemplated that translations of seven decimal digits each may be required, of which, say, the last five digits may be used for routing purposes and the first two for instructional and other purposes. Accordingly with the translations stored in two-out-of-five code, each translation would be constituted by seven groups of five binary digits of which in each group, according to the decimal value represented by the group, two binary digits would be "marked" by being given a particular value (that is "1" in each case or "0" in each case) while the remaining binary digits are given the other ("0" or "1" value). Each translation would therefore require for its storage in parallel form thirty-five translation tracks (seven groups of five) of which at any one address two tracks in each group (fourteen in all) would carry a marked binary digit. Two translations, constituting alternative translations for a given code, may be stored (on seventy translation tracks) at one and the same address, means being provided for choosing by selection of the reading heads associated with the appropriate translation tracks whichever one of the alternative translations may be required. Instead of storing alternative translations at the same address they may be stored at different addresses.

Since register-senders commonly operate by transmitting successive pulse trains separated by significant pauses it could be advantageous for a register-sender to ask for a translation, and the translator to give it, one (decimal) digit at a time during successive inter-train pauses. Generally speaking a complete cycle of operation of the storage device (that is, in the case of a storage drum or disc, a complete revolution) will have to be allowed for reading off a requested translation or translation digit. Further time is required for receiving a code to be translated, for selecting appropriate address tracks and for sending the translation back to the register-sender. It will therefore usually be necessary to allow at least one cycle of operation between successive cycles on which translations are being read off and this may be allowed for by providing a gating arrangement which in effect permits translations to be taken from the storage device only on, say, alternate cycles of operation.

Having now considered some general concepts involved, particular embodiments of the invention will now be described with reference to the accompanying drawings in which.

Figure 1:
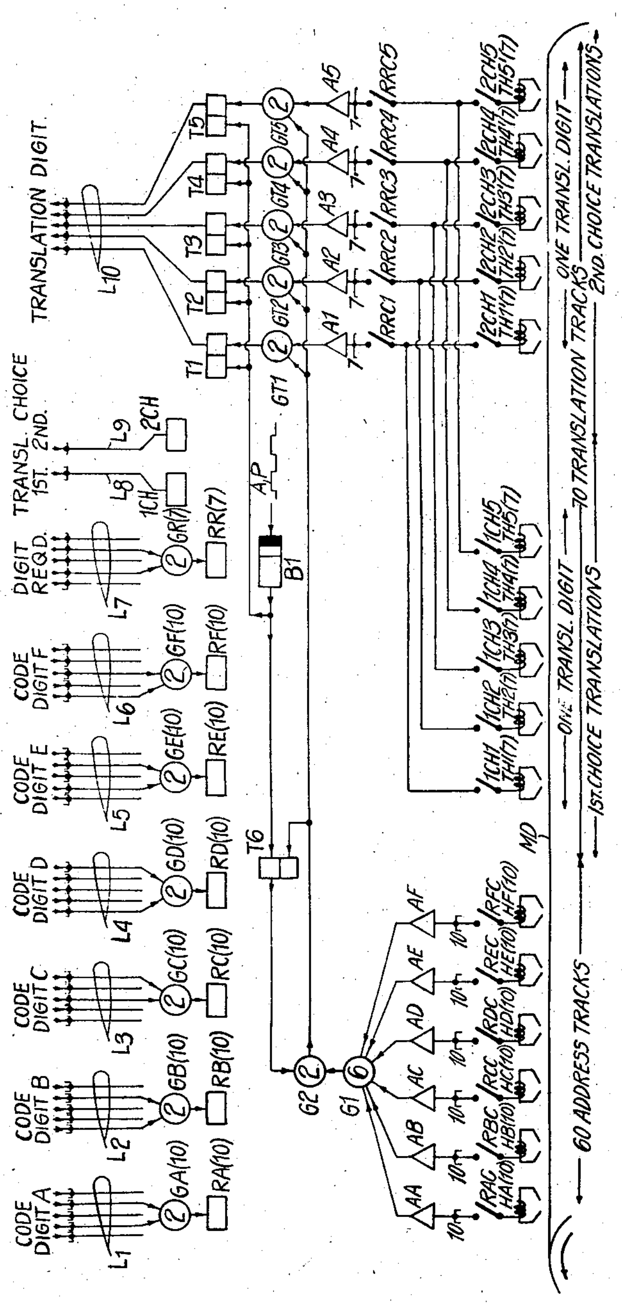
Fig. 1 is a functional diagram of one form of magnetic drum translator in accordance with the invention.
Figure 2:
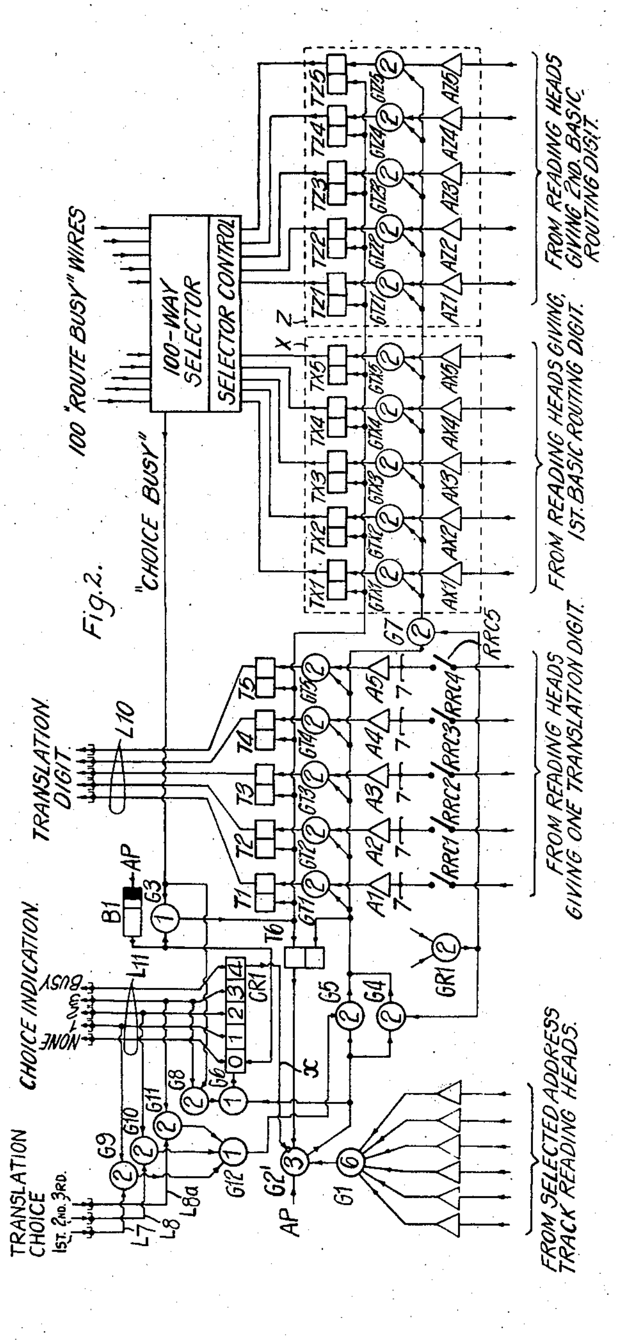
Fig. 2 is a functional diagram of another form.
Figure 3A:
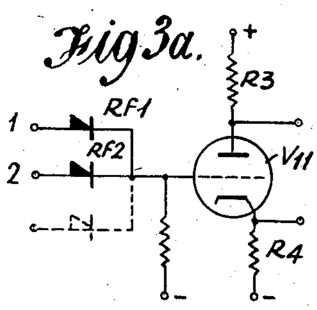
Figure 3B:
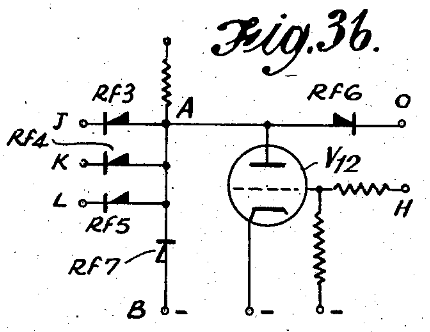
Figure 7:
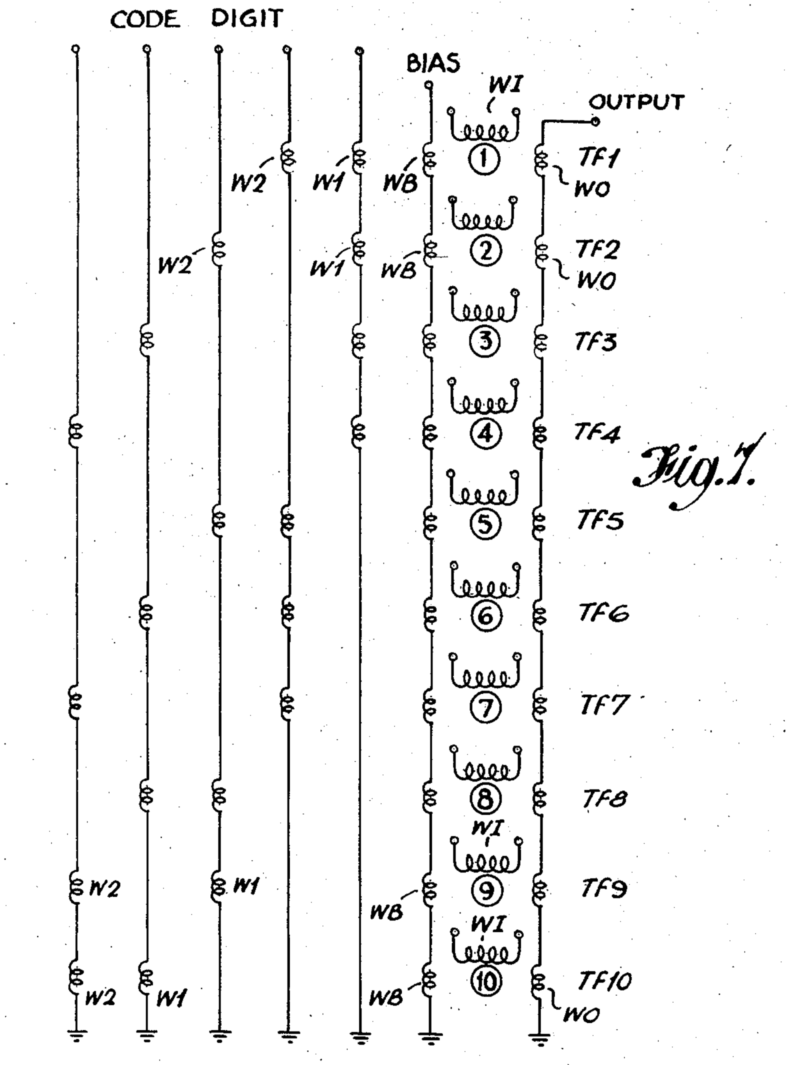

Figs. 3–6, including Figs. 3*a* and 3*b*, are diagrams of suitable circuits for various components represented only by functional symbols in Figs. 1 and 2; and Fig. 7 illustrates a modification that may be used for reading head selection in Figs. 1 and 2.

In Figs. 1 and 2 various functional symbols have been employed to represent gating circuits, trigger circuits and so on. Thus a gate is represented by a circle with two or more input leads—indicated by an arrow head directed towards the circle—and an output lead, the numeral inside the circle indicating that a signal will appear on the output lead (the gate then being said to have opened) when and only when appropriate signals are present on that number of input leads, excluding any input lead terminating in a small circle as in the case of the lead *x* to the gate G2′, this small circle indicating that the presence of a signal on that lead will prevent (inhibit) the gate from opening whether or not signals are present on all the other input leads. By way of example, the gate G1 is opened to produce an output signal only when signals are simultaneously received by its six input leads, whereas the gate G2′ is opened only when signals are received simultaneously on its three input leads other than *x*, and then only if no signal is present on the lead *x*.

A two-position trigger circuit is represented by a double rectangle such as T1; an input lead to a rectangle having also an output lead extending therefrom indicates that in response to a signal on that input lead the circuit will be operated (triggered) to one stable position or state and produce an output signal, while an input lead to the other rectangle indicates that the circuit will be reset to its initial condition by a signal applied to that lead. Likewise a counter circuit (CR1), which may be considered as a multi-state trigger circuit, is represented by a row of numbered squares representing respective stable states from one of which to the next the circuit is stepped by the application of successive pulses to the input lead shown entering one end of the symbol; the output leads extending from the squares each carry a signal when the counter is in the state which the relevant square represents, the counter being reset by applying a signal to the lead entering the bottom of the first (0) square.

A two-part rectangle having a thick bar at one end (for example B1 in Fig. 1) represents a timing element which provides an output pulse coincident with the beginning of an input pulse.

The translators of Figs. 1 and 2 are adapted for use with the first of the two coding schemes outlined above but may readily be modified, as will be described hereinafter, for use with the second of the two schemes. It is therefore assumed in the following description of the drawings that the exchange identification codes each consist of six decimal digits A–F and require translation either for all six digits (when the code identifies an exchange in a neighbouring area to which there is a direct junction) or for only the first three digits A–C. It is also assumed that for each different combination of A–C or A–F digits to be translated alternative translations are provided each consisting of seven decimal digits represented in two-out-of-five code by binary digits stored on the magnetic storage drum in parallel form.

Referring now to Fig. 1 an exchange code requiring translation is received by the translator from a register-sender (not shown) over six groups of leads L1–L6 pertaining respectively to the six decimal digits A–F of the code. In each group of leads the value of the pertinent digit is indicated in two-out-of-five code, the register-sender to this end applying a "mark," that is a potential of given sign, to a particular combination of two leads in the group, the other leads being unmarked.

Each combination of two leads in the group L1 for the A digit is connected to a gating circuit, typified by GA(10), which will open to produce an output signal when the two leads of the combination are marked: in this way the ten GA gates effectively convert the two-out-of-five marking on the leads of group L1 into a one-out-of-ten marking on the output leads of these gates. Likewise gating circuits typified by GB(10)–GF(10) convert the two-out-of-five markings on the groups of leads L2–L6 to one-out-of-ten markings. The GA–GF gates control respective relays, typified by RA(10)–RF(10), which are energized when the corresponding gates are open. Thus for any particular code received from the register-sender one each of the RA–RF relays will be energized.

The energized RA relay closes its contacts RAC to connect an amplifier AA to one reading head of a group of ten such heads typified by the head HA(10) and associated with respective address tracks on the storage drum MD. Likewise the energized RB–RF relays close their contacts RBC–RFC to connect amplifiers AB–AF to respective reading heads selected one from each of five further groups of ten typified by the heads HB(10)–HF(10) and associated with a corresponding number of further address tracks, making sixty address tracks in all. The output sides of the amplifiers AA–AF are connected to respective input leads of a gate G1 which opens to pass an output signal to a further gate G2 when signals appear simultaneously from the six amplifiers.

The periphery of the drum MD is effectively divided into a number of address strips each of which is allocated to a particular combination of A–C or A–F code digits requiring translation and contains for that combination, on seventy translation tracks additional to the address tracks, alternative translations each comprising seven decimal digits stored in parallel, two-out-of-five binary form. It is contemplated that the storage drum could have accommodation for up to, say, about a thousand binary digits per track, so that there could be up to that number of address strips, it being recalled that for parallel storage the width of each address strip is commensurate with that of a unit storage area. For reading off the stored binary digits representing any one decimal translation digit, the five tracks on which these binary digits are stored are associated with respective reading heads typified by TH1(7)–TH5(7) for the first of the alternative translations at the several addresses and by TH1′(7)–TH5′(7) for the second translations.

The addresses are so allocated that one allocated to a particular combination of A–C digits of a code will reach the reading heads later in time than an address allocated to an A–F combination having the same A–C digits; that is, of the codes identifying exchanges in a neighbouring area, those identifying exchanges to which there are direct junctions and thus requiring translation for all six digits will have allocated to them addresses which reach the reading heads ahead of the address allocated to the three (A–C) digits identifying the area itself. It will be appreciated that the number of neighbouring area exchanges to which there are direct junctions will usually be relatively small, requiring the allocation thereto of a correspondingly minor proportion of the storage addresses.

At each address containing translations for a combination of A–F digits, binary digits are stored on those address tracks which, as would be selected by the RA–RF relays, correspond to the digit values in the pertinent combination. Thus for instance at the address allocated to the A–F digits of an exchange code having digit values 314567 a binary digit would be stored on each of the following address tracks: A3 (that is, the third address track of the group associated with the HA heads), B1, C4, D5, E6 and F7. On the other hand, at each address containing translations for a combination of A–C code digits, binary digits are stored on the address tracks corresponding to the pertinent A–C digit values and also on at least all those address tracks which correspond to the different values which the D–F digits associated with the particular A–C combination may have. (It may be noted here that although each code digit has been assumed to be decimal, the number of exchanges in any particular area may be such as not to require the use of all the possible values of the D–F digits in identifying these exchanges.) Thus for instance at the address containing translations for only the A–C digits of the code 314567, that is, for all codes identifying exchanges in the area 314, the address tracks A3, B1 and C4 would be marked with binary digits as before but this time all the D, E and F address tracks (namely D1–D0, E1–E0 and F1–F0) would also be marked.

In addition to marking the leads L1–L6 in accordance with the digits of a code to be translated, the register-sender also marks one of two leads L7 and L8 to select either the first or the second of the alternative translations stored for that code. This energises one or the other of two relays 1CH and 2CH. Furthermore, assuming that a translation is to be taken one (decimal) digit at a time, the register-sender also marks two leads of a further group L9 to indicate in two-out-of-five code which of the seven translation digits is required, the marking of these two leads resulting in the opening of one of seven gates typified by GR(7), which in turn causes the energization of a corresponding relay typified by RR(7). The energised RR relay and the energised relay 1CH or 2CH then select from the translation track reading heads, by means of their contacts such as RRC1–5 and 1CH1–5 or 2CH1–5 respectively, the group of reading heads such as TH1(7)–TH5(7) or TH1'(7)–TH5'(7) which will read from the drum the stored binary digits relating to the required decimal digit of the first or second choice translations as the case may be. The reading heads of the group selected in this way are connected through amplifiers A1–A5 to respective gating circuits GT1–GT5 controlling the operation of trigger circuits T1–T5 from which a group of five leads L10 leads back to the register-sender.

To allow time for the various relays to be operated, successive translation digits are sent back to the register-sender only on alternate revolutions of the drum MD, this being controlled by means of a train of pulses AP which coincide with alternate revolutions and have a duration equal to that of one revolution; this pulse train may be derived for instance by means of a binary counting stage (not shown) stepped at the beginning of each revolution by a revolution marking pulse. The AP pulses are applied to a timing element B which provides an output signal at the beginning of each AP pulse, that is, at the beginning of each translation revolution of the drum.

Operation of the relays having been effected during a revolution of the drum MD for which no AP pulse is applied, at the beginning of the next revolution the output from the timing element B1 resets any of the trigger circuits T1–T5 which may have been in their operated states and operates a further trigger circuit T6 to stimulate the gate G2. If the code received over the leads L1–L6 is one for which translations are stored for all six digits, then during the ensuing translation revolution simultaneous outputs will be obtained from the amplifiers AA–AF first when the address containing the translations for these six digits reaches the reading heads HA–HF and subsequently when the address containing translations for the first three (A–C) digits does so, but at no other time during the revolution. If, however, the received code requires translation for only its particular combination of A–C digits, simultaneous outputs will be obtained from the amplifiers AA–AF when and only when the address containing translations for that combination reaches the reading heads.

On the first, or only, occurrence of simultaneous outputs from the amplifiers AA–AF during the revolution concerned, the gate G1 and consequently the already stimulated gate G2 will open to produce from the latter an output pulse which resets the trigger circuit T6 and by thereby removing the stimulus from the gate G2 prevents it opening in consequence of any subsequent occurrence of simultaneous outputs from the amplifiers AA–AF.

An output pulse is therefore obtained from the gate G2 when and only when the address containing the translations pertinent to the received code reaches the reading heads. This output pulse then opens the gates GT1–GT5 to pass to the trigger circuits T1–T5 the binary digits read at that address by the group of translation track reading heads selected by the energised RR relay in conjunction with the energised relay 1CH or 2CH. Accordingly the binary digits thus passed to the trigger circuits T1–T5 represent, in two-out-of-five code, the required decimal digit from the selected first or second choice translation stored at the address in question for the received code.

Consequent on the two-out-of-five coding, two of the trigger circuits T1–T5 will receive marked binary digits and will therefore operate to mark a corresponding pair of the leads L10 and thereby signal back to the register-sender, still in two-out-of-five code, the value of the required translation digit. The value of the translation digit may be said to be staticised on the trigger circuits T1–T5.

With the arrangement just described a register-sender requiring translation for an exchange code may normally first ask for the first choice translation stored for that code (namely by marking the lead I7). If the route to which this first translation relates is found to be busy—being indicated in the usual manner by a marked "route busy" wire individual to that route—the register-sender then asks for the second choice translation, and if the alternative route to which this second translation relates is also busy the register-sender may send a busy signal to the calling subscriber.

Of those digits in each translation which pertain to the setting up of a route to the called exchange, only some, which will be termed the basic routing digits hereinafter, may be pertinent to the actual setting up of the outgoing route from the calling exchange; for instance, of the seven digits in any translation only the last five may be routing digits and of these only the first two may be used in setting the selectors at the calling exchange, being sufficient to deal with up to a hundred outgoing routes. In order to save a register-sender having to set up a route which may subsequently be found to be busy, it would be convenient to examine the state of the routes from the translator. To this end each group of reading heads associated with translation tracks on which a basic routing digit is stored may be connected, at least during an initial revolution of the storage drum, to a group of gating circuits and trigger circuits arranged and controlled similarly to the group GT1–GT5, T1–T5 in Fig. 1. Consequently when the address containing the translation for a received code reaches the reading heads during the revolution in question, gates G1 and G2 being opened at that time, the basic routing digits will be staticised on the trigger circuits of the pertinent group and may then be used to select for examination the appropriate "route busy" wire. The presence of a busy mark on the wire thus selected may then cause the register-sender to ask for another choice of translation or may itself cause the translator to provide such other choice and signal to the register-sender the fact that it has done so, the register-sender being arranged to continue asking for this latter choice until all the digits of the translation have been read off on subsequent translation revolutions of the drum.

In view of the fact that the first and second choice translations for a given code are stored at one and the same address for the arrangement of Fig. 1, the provision of the facility just described, namely the examination of the state of routes by the translator, would require a large quantity of additional apparatus if, as would be desirable, an examination of all the possible routes pertinent to a given code were to be effected with only one translation revolution of the drum. The amount of additional apparatus necessary to provide this facility may, however, be reduced by modifying the arrangement of the translations as stored on the drum and by also modifying the translating equipment as compared with Fig. 1, the modified arrangement together with the additional apparatus referred to being illustrated by Fig. 2. In this latter figure only those parts of the complete arrangement have been shown which are necessary for illustrating the modifications and additions, the remaining parts being the storage drum MD, its associated address track and translation track reading heads (this time for sixty address tracks but only thirty-five translation tracks as will be explained), the groups of leads L1–L6 over which the digits of a code to be translated are received, the GA–GF gates and the RA–RF relays associated with these leads, the contacts such as RAC–RFC by which these relays effect selection of the address track reading heads, and the group of leads L9 with its associated GR gates and RR rellays; in this modified arrangement the relays 1CH and 2CH are not used. Parts included in Fig. 2 which are common to Fig. 1 have been given the same reference legends.

For the equipment of Fig. 2 each address on the magnetic storage drum contains only one translation of seven decimal digits stored in parallel two-out-of-five binary form, this requiring only thirty-five translation tracks instead of seventy as before. The periphery of the drum is divided into three sectors. The addresses in the first sector are allocated to different combinations of A–F code digits which may require translation, the addresses in the second sector contain first choice translations for respective combinations of A–C code digits requiring translation, and the addresses in the third sector contain second choice translations for these A–C combinations. It is contemplated that usually the second and third sectors would be equal in size and the first only a fraction of their size. Second and third choice translations for each combination of A–F digits requiring translation are provided respectively by the first and second choice translations stored for the A–C digits of the A–F combination in question, while a common third choice translation for all the combinations of A–C digits requiring translation is provided in a final address on the drum. This common third choice translation for A–C digits of a received code may relate, for instance, to a route extending to a regional or national switching centre; alternatively this translation may not relate to any route at all but may be used only to provide an indication to the register-sender that the routes for the first two choices of translation are busy. This will be further described later. In order to give maximum time for examining the state of the route corresponding, say, to a first choice translation before the second choice translation is read off, it is preferably arranged that the addresses respectively containing the different choices of translation for a particular code are spaced round the drum as far apart from each other as is conveniently possible. To indicate which choice of translation is required one of three leads L7, L8, L8*a* is marked.

The combination of A–C or A–F code digits to which any address is allocated and for which it contains a translation is identified by the selective storage of binary digits on the (sixty) address tracks in the same manner as previously described, a binary digit being stored in each address track at the final address containing the common third choice translation for all A–C combinations.

The additional apparatus incorporated in Fig. 2 includes two groups X and Z of amplifiers, gating circuits and trigger circuits arranged and controlled similarly to the group A1–A5, GT1–GT5, T1–T5 but connected permanently to the respective groups of translation track reading heads which read the first and second basic routing digits of the translations stored at the various addresses, it having been assumed that the basic routing digits are two in number providing for the selection of one of a hundred outgoing routes. The group X consists of the amplifiers AX1–5, the gating circuits GTX1–5 and trigger circuits TX1–5, while the group Z consists of the amplifiers AZ1–5, the gates GTZ1–5 and the trigger circuits TZ1–5. The outputs from the trigger circuits TX1–5 and TZ1–5 control the operation of a 100-way selector to connect a selected one of a hundred "route busy" wires (one for each outgoing route) to a single "choice busy" wire leading from the selector. Accordingly if the selected "route busy" wire is marked to indicate that the route to which it relates is busy the "choice busy" lead will likewise be marked.

Fig. 2 also includes a counter CR1 which marks one of five leads L11 to indicate to the register-sender which choice of translation has been taken or if the routes corresponding to all translations for a particular code are busy. The manner in which the counter CR1 is operated will appear from the following description of the overall operation of the equipment which Fig. 2 illustrates in part.

On receipt of a code to be translated, selection of one address track reading head from each of six groups of ten is effected in accordance with the code digit values as previously described for Fig. 1, namely by the RA–RF relays in the latter figure. The register-sender requesting translation for this code initially does not ask for any particular choice of translation (the leads L7, L8 and L8*a* being left unmarked) but simply indicates that the first translation digit is required. This it does by appropriately marking two of the leads L9 (Fig. 1) to open one of the GR gates and operate the corresponding RR relay, the gate thus opened being designated GR1 in Fig. 2. The energised RR relay connects to amplifiers A1–A5, through its contacts such as RRC1–5, the group of reading heads associated with the translation tracks on which the first (decimal) digit of the translation at each address is stored.

At the beginning of the next translation revolution of the storage drum after the relays have been set, the timing element B1, to which the AP pulses are applied as before, produces an output pulse which acts through a gate G3 to reset any of the trigger circuits T1–5, TX1–5 and TZ1–5 that may have been operated and to operate the trigger circuit T6. The pulse from the timing element B1 also ensures that the counter CR1 is reset to its "0"

position. Moreover, during this translation revolution a gate G2′ analogous in function to the gate G2 in Fig. 1, is stimulated by an AP pulse applied to it. When the address containing the first choice translation for the code concerned reaches the reading heads, the gate G1 and consequently the gate G2′ are opened as before, the latter gate producing an output which is applied to two gates G4 and G5 and also to a gate G6 through which it steps the counter CR1 to its "1" position. As the first translation digit has been requested, the gate GR1 is open at this time and accordingly stimulates both the gate G4 and a further gate G7. The output from the gate G2′ therefore passes by way of the gate G4 both to the gates GT1–GT5 and to the gate G7, passing by way of this latter gate to the gates GTX1–5 and GTZ1–5 also. The gates GT1–5 are therefore opened to pass to the trigger circuits T1–T5 the binary digits constituting the first translation digit at the address in question, that is, the first digit of the first choice translation for the received code becomes staticised on the trigger circuits T1–T5, two of which will be operated to this end. Likewise the two basic routing digits of this first choice translation becomes staticised on the trigger circuits TX1–5 and TZ1–5 respectively, in consequence of the opening of the gates GTX1–5 and GTZ1–5.

The outputs from the two groups of trigger circuits TX1–5 and TZ1–5 control the selector in any known manner to select the "route busy" wire for the route which the two basic routing digits identify. If the route is not busy, no mark is applied to the "choice busy" wire and the register-sender takes the first translation digit of the first choice as marked by the trigger circuits T1–T5 in two-out-of-five code on the leads L10. The counter CR1 also signals to the register-sender over the "1" lead of the group L11 the fact that the first choice has been taken. As the output obtained from the gate G2′ by way of the gate G4 will have reset the trigger circuit T6, the gate G2′ will not re-open during the translation revolution under consideration.

If, however, the route corresponding to the first choice translation is busy, the "choice busy" lead will be marked and will open the gate G3 to re-operate the trigger circuit T6 and reset the trigger circuits T1–T5, TX1–5 and TZ1–5. Consequently when the address containing the second choice translation reaches the reading heads the gate G2′ will again be opened by a signal from the gate G1 and the sequence of events will be repeated, the first digit of the second choice translation being staticised on the triggers T1–T5 and the counter CR1 being stepped to its "2" position. Should the route for the second choice translation, and finally that for the third choice be busy, no translation digit will be sent to the register-sender over the leads L10 (the triggers T1–T5 having been reset by the marking on the "choice busy" lead), and a gate G8 opened by the coincidence of a marking on the "choice busy" lead and one on the lead from the "3" position of the counter CR1, will then act through the gate G6 to step the counter to its last position and send a "busy" indication to the register-sender over the L11 lead so labelled.

In the case of a received code requiring translation for the combination of all its digits A–F, if the routes pertinent to all three choices of translation are busy (the third choice corresponding to the second choice translation for the combination of A–C digits in the code as previously indicated) the gate G2′ would be stimulated from the then operated trigger circuit T6 and the G1 gate would receive six simultaneous inputs when the (final) address, storing the third choice translation for the A–C digit combination, is reached. To avoid the trigger circuits T1–T5, and also the trigger circuits TX1–5 and TZ1–5, being operated as a consequence of the gate G2′ being opened at this time the counter CR1 in its last ("busy") position applies an inhibiting signal to the gate G2′ to prevent it from opening at this time.

If, in the case of received codes requiring translation for only their A–C digits, the common translation stored at the final address is not required for setting up a route, the translation digits stored at that address on the translation tracks storing the basic routing digits may be used, as read from the drum and staticised on the trigger circuits TX1–5 and TZ1–5, to cause the selector to connect the "choice busy" lead to a permanently marked busy wire. On reaching the final address therefore, the "choice busy" lead would be marked to cancel the unwanted third choice translation digit then staticised on trigger circuits T1–T5.

Considering now the operation after a free route has been found, on subsequent translation revolutions of the drum the register-sender will mark one of the leads L7, L8 or L8*a* to request the appropriate choice of translation as signalled to it over the leads L11, asking in addition for the second or a later translation digit as may then be required. As each address containing a translation for the code in question reaches the reading heads, a signal will be obtained from the gate G2′ as before and will operate the counter through one step, without, however, opening any of the gates GT1–5 until the address containing the required choice of translation is reached, the gate G5 remaining closed until then and the gates G4 now remaining always closed. The gate G7 also now remains always closed, so that none of the gates GTX1–5 and GTZ1–5 can be opened. When the address containing the required choice is reached and the consequent signal from the gate G2′ has stepped the counter to its corresponding position, one of three gates G9, G10 and G11 will receive coincident signals on its input leads and will open to produce a signal which passes by way of a gate G12 to open the gate G5. This latter gate therefore passes to the gates GT1–GT5 the signal obtained from the gate G2′, resulting in the gates GT1–GT5 opening and the requested translation digit (as read by the reading heads selected by the RR relay now energised) being staticised on the trigger circuits T1–T5 for transmission to the register-sender over the leads L10.

It will be appreciated that with the storage arrangement employed for the equipment of Fig. 2 the number of codes for which the drum can hold translations is approximately halved as compared with the storage arrangement for Fig. 1. This restriction could be circumvented however if the total number of codes could be divided in two equal or nearly equal parts; this would be possible for instance if it were arranged that one of the code digits had always one or other of only two values instead of having ten possible values as has been assumed in the foregoing. Two translations could then be stored at each address (on seventy translation tracks), the first translations at the several addresses being pertinent to codes having one value for the two-value digit and the second translations being pertinent to the codes having the other value of that digit. The reading heads giving the one or the other translation at any address could then be selected by a relay operated in response to the appropriate value of the digit concerned, while the selection of the relevant address would be effected in dependence on the values of the remaining digits.

The translating equipment of Figs. 1 and 2 is adapted for the first of the two particular exchange codings outlined earlier. In adapting the equipment for the second of the coding schemes outlined, namely in which an exchange code having a maximum of five (A–E) digits may require translation for five, four or three digits, only five groups of leads such as L1–L5 would be required for receiving the A–E code digits respectively, instead of six as in Fig. 1. Likewise only five groups of ten address tracks would be required for identifying the various addresses and the gate G1 would be arranged to open on receipt of five rather than six simultaneous inputs. On the storage drum, addresses allocated to codes requiring translation for four digits would come after those allocated to codes requiring translation for five digits and before those allocated to codes requiring translation for three digits. Otherwise the equipment may be as already described.

It is contemplated that translating equipment in accordance with the invention may be employed in conjunction with a number of register-senders which would be connected to it in turn; the sequential connection of the register-senders could be effected by means of gating circuits opened at appropriate times by pulses from a scanning pulse generator constituted for example by some form of cyclic counter having a number of stable positions (corresponding to the number of register-senders) between which it may be stepped by the AP pulses employed for the translator. Since the register-senders are connected one at a time, they could use the same input leads to and output leads from the translator, this having been indicated in Figs. 1 and 2 by the square brackets applied to the leads L1–L11.

The gating circuits employed, except G2′, G3, G6, G12, may be constituted as shown in Fig. 3. Referring to this figure, the gating circuit comprises a thermionic valve V1 having anode and cathode resistors R1 and R2. The grid of the valve is connected to a first input terminal X through a resistor R3 and to a second input terminal Y through a half-wave rectifier R*f* poled to conduct current in the direction away from the grid. The valve is normally in a non-conductive state. If a positive signal is applied to the terminal X but no signal is applied to the terminal Y, this signal will be diverted away from the grid through the rectifier R*f* and the valve will remain non-conductive. If, however, a positive signal is applied to the terminal Y at the same time as one is applied to the terminal X, the rectifier R*f* will be backed off by the signal at the Y terminal and the signal at the X terminal will then raise the grid potential of the valve, resulting in the valve becoming conductive. A negative-going output signal will then be obtained at the anode of the valve and a positive-going signal at its cathode, either of these signals being used as may be most suitable for a following circuit. Such output signal is obtained only when both the input terminals X and Y receive a positive signal together. In the case of the gate G1 which has to open only on coincidence of more than two signals, the grid of the valve would be connected to an appropriate number of additional input terminals through respective half-wave rectifiers poled similarly to the rectifier R*f*; thus for the gate G1 four such additional input terminals would be provided, this having been indicated in dotted lines in Fig. 3.

The gating circuit G6 may be constituted as shown in Fig. 3*a*. The two input terminals 1 and 2 of this gate are connected through rectifiers R*f*1 and R*f*2 to the grid of a thermionic valve V11 having anode and cathode resistors R3 and R4, the rectifiers being poled towards the grid. The valve V11 is normally non-conductive but on application of a positive signal to one or other of the input terminals, becomes conductive to produce a negative-going output signal at its anode and a positive-going output signal at its cathode. Either of these output signals may be used as may be most suitable for the succeeding circuit. A similar circuit could be used for the gate G12, with an additional input terminal connected to the valve grid through a similarly poled rectifier as indicated in dotted lines in Fig. 3*a*.

For the gate G2′ in Fig. 2 the circuit of Fig. 3*b* may be used. In the absence of a signal on the inhibition terminal H (to which the lead *x* would be connected), and with any one of the input terminals J, K, L unmarked by any positive signal applied thereto, the point A is clamped to the normally negative potential of such unmarked terminal due to current flow to that terminal from the positive terminal (+) through resistor R5 and the associated one of the rectifiers R*f*3, R*f*4, R*f*5. With the terminals J, K, L all marked with positive signals applied thereto, the rectifiers R*f*3, R*f*4, R*f*5 are all backed off and with no such signal applied to terminal H, the point A is allowed to rise to the potential of the applied positive signal, resulting in the rectifier R*f*6 conducting and an output signal appearing at the terminal O. If, however, a positive signal is applied to terminal H the normally non-conductive valve V12 is caused to conduct so that its anode potential falls. When, as a result, the anode potential reaches that of the negative terminal B, the rectifier R*f*7 conducts causing the anode of the valve, and thus the point A to be clamped to this latter potential. The point A cannot then rise until the valve V12 ceases to conduct on removal of the inhibiting signal on terminal H, even although positive signals may be present on all the terminals J, K, L.

The trigger circuits employed may as shown in Fig. 4 each comprise two thermionic valves V2 and V3 having respective anode load resistors R6 and R7. The anode of each valve is connected through two series-connected resistors R8 and R9 or R8′ and R9′ to a source of negative bias, the junction of the series-connected resistors being connected to the control grid of the alternate valve. With the valve V2 cut off its anode is at the positive H.T. potential and biases the valve V3 to the conducting condition through the potentiometer constituted by the resistors R8, R9. Application of a positive potential to terminal M causes valve V2 to conduct so that its anode potential falls and the grid potential of valve V3 is likewise reduced to cut off the latter valve and produce a corresponding positive-going output signal at the terminal O connected to the anode. The gride of the valve V2 is then positively biased from the anode of the valve V3 through the potentiometer constituted by the resistors R8′, R9′, so that the valve V2 remains conducting even after the triggering potential has been removed from terminal M. The circuit is reset by the application of a positive potential to the terminal N, when a similar operation will be produced in reverse.

For the counter CR1 in Fig. 2 a circuit employing a multi-cathode cold cathode discharge tube of the kind such as that known by the name "Dekatron" may be used, a suitable circuit being illustrated in Fig. 5. These multi-cathode tubes contain in addition to a common anode and a plurality of cathodes, two so-called guide or transfer structures each having electrodes between adjacent cathodes of the tube so as when supplied with time displaced pulses to cause a discharge existing between the anode and any one cathode to shift to the next cathode in a given direction. These tubes are well known in the electronics art and their operation need not be discussed in detail here. In the counter circuit of Fig. 5 a "Dekatron" is conventionally represented at D with its anode indicated at *a*, its cathodes indicated by the numbers 0–9 and the terminals for the guide electrode structures (otherwise not represented) indicated at *g*. The cathodes 0–4 are connected to earth through respective resistances R10 and the cathodes 5–9 inclusive are strapped to the cathode 5. The two guide electrode terminals *g* are connected through respective resistances R11 and R12 and a common capacitor C1 to the anode of a valve V4, this valve having an anode resistor R13. One of the guide electrode terminals *g* is also connected to earth through a capacitor C2 so that negative pulses received from the anode of the valve V4 will appear first at one set of guide electrodes and then after a time lag determined by the time constant of R12, C2 on the other set of guide electrodes, thereby causing transfer of a discharge existing at one cathode to the next cathode in inclusive numerical order. In operation positive pulses from the gate G6 in Fig. 2 would be applied to the grid of the valve V3, resulting in negative pulses appearing at its anode and a discharge on one cathode of the "Dekatron" being shifted to the next cathode. The discharge is initially caused to be on the 0 cathode (corresponding to the 0 position of the counter) by a setting pulse of negative polarity applied at the terminal P to reduce temporarily the potential of the 0 cathode, this setting pulse being obtained from the timing element B1. The cathodes 0–4 are connected to respective output leads which constitute the leads L11 for Fig. 2, it being appreciated that a positive output signal will appear at the output lead connected to the cathode which is receiving the discharge at any given time.

The timing element B1 may be simply constituted by a valve V5 (see Fig. 6) to the grid of which input pulses are applied through a differentiating circuit comprising series capacitance C3 and shunt resistance R14. With the time constant of C3, R14 small compared with the pulse length an input pulse of positive polarity will be differentiated to give on the grid of the valve V5 a short positive-going pulse at the beginning of the input pulse. This will cause the valve (which is normally non-conductive) to conduct for a short interval and give a corresponding positive-going output pulse across its cathode resistor R15.

Whereas the circuit details described with reference to Figs. 3–6 employ thermionic valves, it is to be understood that similar circuits may alternatively be used employing transistors instead, any necessary circuit modifications being apparent to those skilled in the art.

Each group of coincidence gates and associated relays (such as the GA gates and RA relays) employed in Fig. 1 for selecting from a group of ten reading heads a particular one indicated by a received two-out-of-five marking, may be replaced, in a modification of the embodiment of Fig. 1 or Fig. 2, by a system such as that of Fig. 7 employing multiple winding saturable transformers. Referring to Fig. 7, a group of ten saturable transformers Tf1–Tf10 is used for selecting one out of ten reading heads (not shown) in response to and in accordance with a code digit received over a group of leads L in two-out-of-five code, this corresponding to the functions of several groups of gates and relays associated respectively with the groups of leads L1–L6 in Fig. 1. Each of the transformers Tf1–Tf10 has a core represented by the correspondingly numbered circle, an input winding W1, two control windings W1 and W2, a bias winding WB, and an output winding WO, the output windings of the several transformers being connected in a series "chain" between earth and an Output lead, so labelled. The control windings W1 and W2 of each transformer are arranged in respective series connections between earth and two of the five leads L, the particular pair of leads L with which the control windings W1 and W2 of any transformer are associated in this way being unique to that transformer, as can be seen upon examination of the connections in Fig. 7. The input windings WI of the transformers Tf1–Tf10 are connected to receive the outputs from the respective reading heads of the group from which one head is to be selected. The bias windings WB of the transformers Tf1–Tf10 are connected in a series "chain" between earth and a source of bias potential the magnitude of which is chosen so that, in the quiescent state, the current flowing through the bias windings saturates the transformers and thereby renders ineffective the small currents received by the input windings from the respective reading heads connected to them. When two of the leads L are marked to indicate the value of a received digit, one of the transformers, and only one, has current flowing in both its control windings W1 and W2, these currents being in such sense and of such magnitude as together to completely oppose the effect of the current in the bias winding of that transformer. The core of that particular transformer is therefore brought out of saturation and current flowing in its input winding WI from the reading head connected thereto can then induce current in the output winding WO of the transformer to produce a corresponding signal on the Output lead. The circuit conditions are chosen to require that both control windings W1 and W2 of any transformer must carry current from the leads L before its core is brought out of saturation: therefore although several other transformers have current flowing in one of their control windings W1 or W2 when leads L are marked in two-out-of-five code, the cores of these other transformers remain sufficiently saturated to prevent input current in their WI windings from being effective to produce any output. Consequently the signal obtained at the Output lead will be a reproduction of the binary digits read from the magnetic drum by the reading head selected in dependence on the code digit received over the leads L.

It will be apparent that analogous saturable transformer arrangements having bias windings connected for selective energisation according to a received marking, may also be used if desired for translation track reading head selection according to a particular translation digit required and to a particular choice of translation.

What I claim is:

1. Translating equipment for providing translations for digital codes, comprising in combination: a continuously operable information storage device as having translation storage tracks effectively defined thereon for the parallel storage at some addresses of translations pertaining to codes requiring translation for a certain maximum number of digits, and at other addresses of translations pertaining to codes requiring translation for a lesser number of digits; reading heads associated respectively with the translation tracks means for receiving said maximum number of digits of a code requiring translation; selection means responsive to the combined values of the digits in said maximum number for selecting an address, if any, at which a translation for that combination is stored, said selection means functioning in the absence of such translation and in response to the combined values of at least a lesser number of the received digits for selecting an address at which a translation for such lesser number is stored; and means for passing towards the output of the translator, translation information read by the reading heads from whichever address the selection means may have selected.

2. Translating equipment as claimed in claim 1 wherein the storage device has also defined thereon a number of address tracks allocated one to each possible value of each code digit in said maximum number thereof and permitting each address to be identified by storing at the address a number of address digits of which one is stored one on each of those address tracks that are allocated to the respective digit values in the combination of digits for which the address contains a translation, the address selection means comprising a plurality of reading heads respectively associated with the address tracks and located relatively to each other so as to coincide substantially simultaneously with each address, means for selecting in accordance with the digit values of a received code the address tracks allocated thereto, and means responsive to simultaneous reading of address digits from all the selected address tracks for causing translation information to be passed towards the output of the translator from the address at which such simultaneous reading takes place.

3. Translating equipment as claimed in claim 2 including for address track selection, means responsive to the value of each received code digit to select, from those reading heads that are associated with the address tracks allocated to the possible values of said code digit, the head associated with the particular track which is allocated to the received value of the digit.

4. Translating equipment as claimed in claim 2 wherein any address containing a translation for a number of code digits which form part of a larger number also having a stored translation, is located on the storage device at a position after the address which contains the translation for such greater number of digits, the equipment including means responsive to a simultaneous reading of address digits from all the selected address tracks to render ineffectual as regards address selection any subsequent simultaneous reading of address digits from these tracks in the same cycle of operation of the storage device.

5. Translating equipment as claimed in claim 4 including first gating means effective to produce an output signal in response to a simultaneous reading of address digits from all the selected address tracks, second gating means for passing said output signal to control the passing of translation information towards the output of the translator, and means responsive to said output signal to close the second gating means after the output signal has passed it, thereby to render any subsequent simultaneous reading ineffectual.

6. Translating equipment as claimed in claim 1 adapted for use with at least two translations stored at each address and including means governed by an indicated choice of translation to select from the translation track reading heads those associated with the translation tracks on which that choice is stored at the several addresses, the translation information passed towards the translator output from a selected address being taken from the translation track reading heads thus selected.

7. Translating equipment as claimed in claim 1 adapted for use with at least two translations stored at different addresses for the same combination of code digit values, the address selection means responsive to digit values of a received code being governed also by an indicated choice of translation for selecting the appropriate one of the two or more addresses containing translations for said received code.

8. Translating equipment as claimed in claim 7 including provision whereby a translation stored for a number of code digits forming part of a greater number of such digits for which a translation is also stored, is available as an alternative to the last-mentioned translation.

9. Translating equipment as claimed in claim 2 adapted for use with at least two translations stored at different addresses for the same combination of code digit values and wherein any address containing a translation for a number of code digits forming part of a larger number for which there is also a stored translation, is located on the storage device at a position after the address which contains the translation for such greater number of digits, which equipment includes counting means responsive to successive simultaneous readings of address digits from all the selected address tracks, said simultaneous readings occurring at respective addresses each containing a translation for the received code, and means responsive jointly to an indicated choice of translation and to the count reached by the counting means at any instant for causing translation information to be passed towards the output of the translator from the address at which the counting means reaches a count corresponding to the indicated translation choice.

10. Translating equipment as claimed in claim 1 intended for a switching system in which certain digits of each translation are basic to determining a route, the equipment including means for abstracting the basic routing digits of a translation stored at an address selected in response to received code digits, and means responsive to the values of the abstracted digits for testing whether the route to which they relate is busy.

11. Translating equipment as claimed in claim 7 intended for a switching system in which certain digits of each translation are basic to determining a route, the equipment including means for abstracting the basic routing digits of a first choice translation as stored at an address selected in response to received code digits, means responsive to the values of the abstracted digits for testing whether the route to which they relate is busy, and means responsive to the tested route being found to be busy for causing selection of a second choice translation.

12. Translating equipment as claimed in claim 2 adapted for use with at least two translations stored at different addresses for the same combination of code digit values, and wherein any address containing a translation for a number of code digits forming part of a larger number for which there is also a stored translation, is located on the storage device at a position after the address which contains the translation for such greater number of digits, which equipment, being intended for a switching system in which certain digits of each translation are basic to determining a route, includes first gating means effective to produce an output signal in response to each simultaneous reading of address digits from all the selected address tracks, second gating means for passing such output signal to control the passing of translation information towards the translator output from the address at which the simultaneous reading giving rise to such signal occurs, means for temporarily storing such information, means responsive to said output signal for closing the second gating means, means for abstracting the basic routing digits from the translation stored at said address, means responsive to the abstracted digits for testing whether the route to which they relate is busy, and means for reopening the second gating means in response to the tested route being found to be busy, thereby to permit an output signal obtained from the first gating means on a subsequent simultaneous reading of address digits to be passed by the second gating means to control the passing towards the translator output of translation information from the address at which such subsequent simultaneous reading takes place, this last-mentioned information being so passed instead of the temporarily stored information.

13. Translating equipment as claimed in claim 1 including means for selecting from the translation track reading heads, in accordance with a particular translation digit indicated as being required, those heads associated with the translation tracks on which such digit is stored at the several addresses, the translation information passed towards the output of the translator from a selected address being obtained from the translation track reading heads thus selected.

14. Translating equipment as claimed in claim 1 including, for selecting a particular reading head from a group thereof, a selecting circuit comprising a plurality of saturable transformers, one for each head in said group, each including input winding means for receiving the output from the appertaining head, bias winding means for maintaining the transformer saturated in quiescent state, and output winding means connected in common with the output winding means of the other transformers between output terminals for the circuit, said transformers also including respective control winding means connected to be selectively energised, in accordance with the reading head to be selected, to de-saturate only the particular transformer associated with that head, whereby said transformer is rendered responsive to output from its associated reading head to provide a corresponding output at said terminals.

15. Translating equipment as claimed in claim 9 intended for a switching system in which certain digits of each translation are basic to determining a route, the equipment including means for abstracting the basic routing digits of a first choice translation as stored at an address selected in response to received code digits, means responsive to the values of the abstracted digits for testing whether the route to which they relate is busy, and means responsive to the tested route being found to be busy for causing selection of a second choice translation.

16. Translating equipment as claimed in claim 12 including also counting means responsive to successive simultaneous readings of address digits from all the selected address tracks, said simultaneous readings occurring at respective addresses each containing a translation for the received code, and means responsive jointly to an indicated choice of translation and to the count reached by the counting means at any instant for causing translation information to be passed towards the output of the translator from the address at which the counting means reaches a count corresponding to the indicated translation choice.

References Cited in the file of this patent

UNITED STATES PATENTS

| | | |
|---|---|---|
| 2,683,772 | Flowers | July 13, 1954 |
| 2,738,382 | Brooks et al. | Mar. 13, 1956 |
| 2,740,003 | Newby | Mar. 27, 1956 |
| 2,764,634 | Brooks et al. | Sept. 25, 1956 |